Patented Apr. 23, 1929.

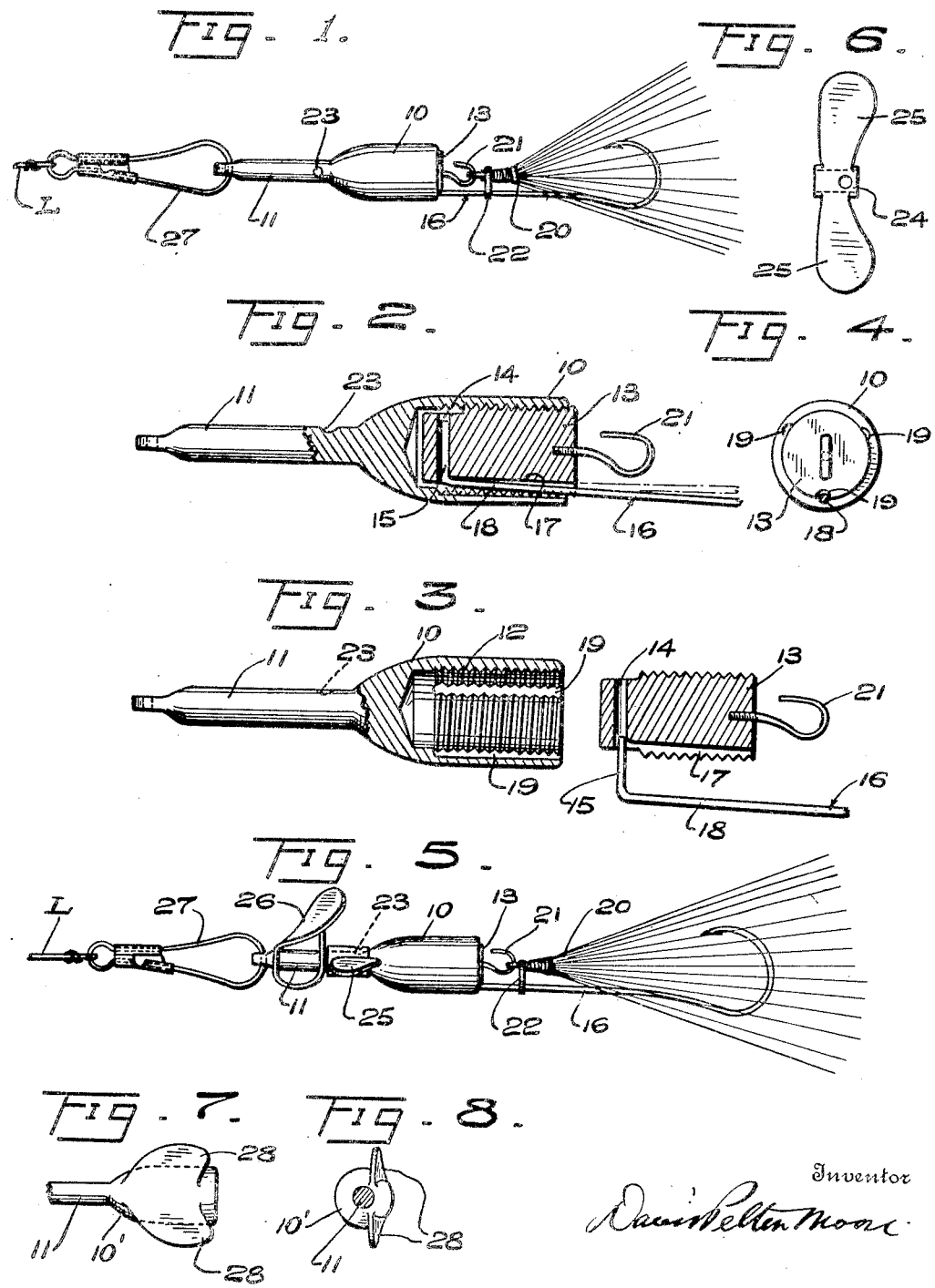

1,710,102

UNITED STATES PATENT OFFICE.

DAVID PELTON MOORE, OF AVON PARK, FLORIDA.

FISH LURE.

Application filed March 5, 1928. Serial No. 259,166.

This invention relates to improvements in fish lures, one object of the invention being the provision of a casting or trolling lure or artificial bait, in which the fish hook is so mounted with relation to the carrying member as to permit the easy insertion or removal of the hook, and in which the fish hook acts as a pawl or locking bolt to prevent the accidental release of the hook.

Another object of the invention is the provision of lure or artificial bait, having a main carrying member composed of two separable interengaging elements, and so constructed and arranged that various combinations of hook, flies and other types of lures and spinners may be used at will, and without the use of a screw driver or other separate instrument.

In the accompanying drawings:—

Figure 1 is a side elevation of the complete lure, using a deer or buck tail fly, and showing how the line is attached.

Figure 2 is a longitudinal section through the same, the hook end of the fish hook not being shown.

Figure 3 is a similar view to Figure 2 with the parts separated.

Figure 4 is an end taken from the right of Figure 2.

Figure 5 is a view similar to Figure 1 showing the fin and spinner set in place.

Figure 6 is a plan view of the fin attachment per se.

Figures 7 and 8 are detailed views showing the fins integral with the female member of the lure.

Referring to the drawings, the numeral 10 designates the main or female member, which may be made in an antomatic screw machine or die cast, and is provided with the reduced end 11, apertured to receive the snap 27 and by means of which the lure may be attached to the line L. The cavity 12 is interiorly threaded to detachably receive the plug or male member 13, which is also provided with the diametrically disposed bore 14 and the longitudinal recess or groove 17, leading from said bore with its bottom inclined.

The bent terminal 15 of the fish hook 16, as shown in Figure 3, is inserted in the bore so that its shank 18 will rest in the groove 17, the angle of the terminal 15 and the bore and groove co-acting to cause the resiliency or spring of the shank of the hook to exert a tension outwardly, so that in order to insert the plug and hook, the hook must be forced into the groove 17, while the female member is rotated, or vice versa. When the plug is in the position as shown in Figure 3, the hook is released, and its shank is sprung outwardly and seats within one of the recesses 19, and thus acts as a pawl or bolt to lock the plug against rotation, and is thus held firmly in the member 10.

The fly 20, or other lure or artificial bait is attached to the small hook or fastener 21 carried by the plug, and may be held toward the fish hook by a ruber band 22, or where desirable the hook may carry the fly as is customary.

The reduced end 11 is provided with a notch 23 to receive the sleeve 24 of the fin member 25 when desired, while the spinner 26 is also detachably mounted upon the same. In this manner, any combination of fin and spinner may be used, or fin alone, as may be desired, the fastener or snap 27 acting to prevent either or both from coming off the end 11.

As shown in Figures 7 and 8, the female or main member 10', instead of being substantially cylindrical is made with the integral fins 28, without in any manner altering the other parts, the plug being insertible in the before mentioned manner, this form, however, providing a fixed means for directing the lure through the water when being pulled, and also permitting the lure to have various movements imparted thereto.

From the foregoing description taken in connection with the drawings, the operation of the present lure is readily understood and its many advantages fully appreciated, but to insert a hook, the parts are in the position as shown in Figure 3, the hook is then pushed to seat properly in the plug, and then either the plug or the member 10 or 10' is rotated, until the plug is seated, at which time the hook is released and its shank will automatically engage the inner face of the female member, and if adjacent the recess 19 will seat therein, and if not the plug can be rotated in either direction until it does.

By this form of lure many sizes of hook may be used with a single carrying member, and the sportsman without the employment of a screw driver or knife blade can make the necessary change, and use many combinations of flies, fins, spinners and bait, it merely being necessary to depress the shank of the fish hook and with it and the hook 21 as a finger piece rotate the plug in either direction to remove or insert the plug.

What I claim as new is:—

1. A fish lure, including two members interlockingly fitting together by a longitudinal and rotary movement, and a third member having a shank carried by one of said two members and cooperating with the other of said two members to hold the first two members against independent rotation.

2. A fish lure, including two longitudinally movable and rotary interengaging members, and a third member having a shank carried by one of said interengaging members and so mounted that its shank acts as a resilient bolt to lock the interengaging members against independent rotation.

3. A fish lure, including a member open at one end, a plug rotatably fitting in the open end thereof, and a second member having a shank held in the open end by the plug, and its shank cooperating with the first member to lock the plug against independent rotation.

4. A fish lure, including a member open at one end, a plug rotatably fitting in the open end thereof, cooperating means for removably holding the plug in the open end against longitudinal movement, and a member having a shank held in the open end by the plug with its shank cooperating with the first member to lock the plug from independent rotation.

5. A fish lure, including a member open at one end, there being threads formed in said open end, an externally threaded plug fitting in said open end, and a member having a shank secured to the first member by the plug, the shank cooperating with the first member to lock the plug against unscrewing.

6. A fish lure, including a line engaging member provided with an internally threaded cavity in one end, an externally threaded plug fitting therein, a member having a shank removably attached to the first member by the plug, and means coacting with the shank of the second member to lock the plug against unscrewing.

7. A fish lure, including a member having a cavity in one end, a plug for said cavity, coacting means carried by the member and the plug for securing the plug to the member, a second member having a shank connected to the first member by the plug, the shank of the second member acting as a resilient lock for holding the plug against accidental displacement.

8. A fish lure, including a member having a cavity in one end having a ratchet recess in the wall thereof, a plug for the cavity, coacting means carried by the plug and cavity for connecting the plug in the cavity and holding it against longitudinal movement, and a second member having a shank connected to the first member by the plug and disposed so that the shank thereof will engage in the ratchet recess to lock the plug against rotation.

9. A fish lure, including a member having an internally threaded cavity in one end and with a ratchet recess in the wall thereof, an externally threaded plug fitting removably in said cavity and provided with a recess, a second member having a shank fitted in said recess of the plug and attached to the member by the plug, the shank of the second member being adapted to engage the ratchet recess of the first member to lock the plug against rotation.

10. A fish lure, according to claim 9, in which the recess of the plug is of sufficient shape and depth as to act upon the shank and to force it into the ratchet recess and to permit the shank to be moved by hand to disengage the shank from the ratchet recess and permit the rotation of the plug and shank.

11. A fish lure, including a male and female member connected by rotary movement, and a third member having a shank carried thereby with its shank acting normally to lock the male and female members against independent rotation.

12. A fish lure according to claim 11, in which the male member is longitudinally grooved to receive the shank to permit the shank to act as a spring locking bolt.

In testimony whereof I affix my signature.

DAVID PELTON MOORE.